(12) United States Patent
Kang et al.

(10) Patent No.: US 10,178,380 B2
(45) Date of Patent: Jan. 8, 2019

(54) APPARATUS AND METHOD FOR PREDICTING EYE POSITION

(71) Applicant: Samsung Electronics Co., Ltd., Suwon-si, Gyeonggi-do (KR)

(72) Inventors: Byong Min Kang, Yongin-si (KR); Jingu Heo, Yongin-si (KR); Dong Kyung Nam, Yongin-si (KR); Seok Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 409 days.

(21) Appl. No.: 14/795,562

(22) Filed: Jul. 9, 2015

(65) Prior Publication Data
US 2016/0173863 A1    Jun. 16, 2016

(30) Foreign Application Priority Data

Dec. 10, 2014    (KR) .................. 10-2014-0177448

(51) Int. Cl.

| | |
|---|---|
| *H04N 7/18* | (2006.01) |
| *H04N 9/47* | (2006.01) |
| *H04N 13/383* | (2018.01) |
| *H04N 13/144* | (2018.01) |
| *G06F 3/01* | (2006.01) |

(Continued)

(52) U.S. Cl.
CPC ....... *H04N 13/383* (2018.05); *G02B 27/0093* (2013.01); *G06F 3/013* (2013.01); *G06T 7/73* (2017.01); *H04N 13/144* (2018.05); *H04N 13/275* (2018.05); *H04N 13/376* (2018.05);
(Continued)

(58) Field of Classification Search
None
See application file for complete search history.

(56) References Cited

U.S. PATENT DOCUMENTS

| | | | |
|---|---|---|---|
| 8,890,865 B2 | 11/2014 | Park et al. | |
| 2006/0146046 A1* | 7/2006 | Longhurst | G01S 3/7865 345/418 |

(Continued)

FOREIGN PATENT DOCUMENTS

| | | |
|---|---|---|
| CN | 102098524 A | 6/2011 |
| CN | 102378032 A | 3/2012 |

(Continued)

OTHER PUBLICATIONS

Extended European Search Report for Corresponding European Application No. 15195893.1 dated May 30, 2016.
(Continued)

*Primary Examiner* — Talha M Nawaz
(74) *Attorney, Agent, or Firm* — Dickey & Pierce, P.L.C.

(57) ABSTRACT

An apparatus and method for predicting an eye position includes a storer configured to store detected position information of an eye of user during a sample time interval, a calculator configured to calculate a weighted average value of a variation of the detected position information, and a predictor configured to generate prediction position information of the eye of user at a target time based on the weighted average value, and the calculator is configured to apply a weight to the variation of the detected position information such that the weight increases as the target time is approached during the sample time interval.

20 Claims, 8 Drawing Sheets

(51) Int. Cl.
  *G06T 7/73* (2017.01)
  *G02B 27/00* (2006.01)
  *H04N 13/275* (2018.01)
  *H04N 13/376* (2018.01)
  *G02B 27/01* (2006.01)

(52) U.S. Cl.
  CPC ............ *G02B 2027/0187* (2013.01); *G06T 2207/20076* (2013.01); *G06T 2207/30201* (2013.01)

(56) References Cited

U.S. PATENT DOCUMENTS

| | | | |
|---|---|---|---|
| 2010/0201798 A1* | 8/2010 | Ren | H04N 7/18 348/78 |
| 2010/0202667 A1* | 8/2010 | Ren | G06K 9/00604 382/117 |
| 2012/0154277 A1* | 6/2012 | Bar-Zeev | G02B 27/017 345/158 |
| 2012/0169724 A1 | 7/2012 | Park et al. | |
| 2013/0136302 A1 | 5/2013 | Nam et al. | |
| 2013/0286168 A1* | 10/2013 | Park | G09G 3/003 348/54 |
| 2017/0180720 A1* | 6/2017 | Jarc | G02B 21/0012 |

FOREIGN PATENT DOCUMENTS

| | | |
|---|---|---|
| CN | 103051909 A | 4/2013 |
| EP | 1602322 A1 | 12/2005 |
| KR | 10-0380994 B1 | 4/2003 |
| KR | 2010-0017869 A | 2/2010 |
| KR | 2012-0056936 A | 6/2012 |
| KR | 10-1165764 B1 | 7/2012 |
| KR | 2013-0080355 A | 7/2013 |
| WO | WO-2013-040683 A1 | 3/2013 |

OTHER PUBLICATIONS

Office Action for Corresponding Chinese Patent Application No. 201510909248.4 dated Nov. 13, 2017 and English translation thereof.

* cited by examiner

LE[n-1]   LE[n-2]   LE[n-3]   LE[n-4]   LE[n-5]   LE[n-6]   LE[n-7]

LE[n]   LE[n-1]   LE[n-2]   LE[n-3]   LE[n-4]   LE[n-5]   LE[n-6]

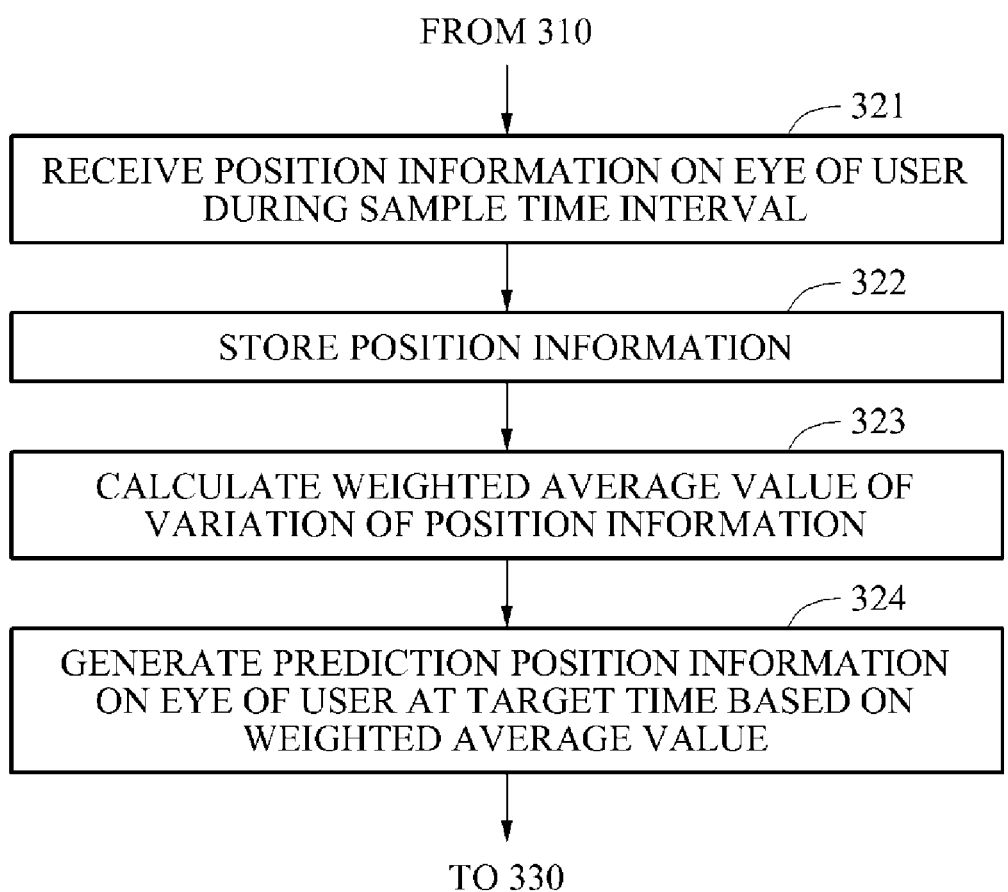

APPARATUS AND METHOD FOR PREDICTING EYE POSITION

CROSS-REFERENCE TO RELATED APPLICATION

This application claims the priority benefit of Korean Patent Application No. 10-2014-0177448, filed on Dec. 10, 2014, in the Korean Intellectual Property Office, the entire contents of which are incorporated herein by reference in its entirety.

BACKGROUND

1. Field

At least one example embodiment relates to an eye tracking based three-dimensional (3D) display.

2. Description of the Related Art

Recently, three-dimensional (3D) displays have gained more attention due to their ability to represent an image in a more realistic manner than a two-dimensional (2D) display. Various 3D display methods may include an eye-tracking based glassless 3D display method. An eye-tracking based glassless 3D display may utilize a display method of detecting an eye position of user and outputting a left eye image and a right eye image included in a 3D image to the respective eyes of the user. In the eye tracking based glassless 3D display, accurately outputting an image to the eye position of user may be significant. Therefore, there is a desire for accurately detecting the eye position of user when the image is output.

SUMMARY

Some example embodiments relate to a three-dimensional (3D) display apparatus.

In some example embodiments, the 3D display apparatus may include an eye position tracker configured to determine position information on an eye of a user, an eye position predictor configured to generate prediction position information on the eye of user at a target time based on a variation of the position information during a sample time interval, and an image processor configured to render a 3D image based on the prediction position information.

The eye position predictor may be configured to generate the prediction position information at the target time based on a sum of the position information at the target time and a weighted average of the variation of the position information during the sample time interval.

The eye position predictor may be configured to calculate a weighted average value of the variation of the position information, and generate the prediction position information based on the weighted average value.

The eye position predictor may be configured to apply a weight to the variation of the position information, the weight increasing as the target time approaches during the sample time interval.

The weight may be determined based on a normal distribution having a maximum value at the target time.

The prediction position information may include first prediction position information generated based on the variation of the position information and second prediction position information generated based on a variation of the first prediction position information.

The image processor may be configured to render the 3D image based on the second prediction position information.

The eye position predictor may include a storer configured to store the position information on the eye of user during the sample time interval, and the storer is configured to shift position information stored in the storer in advance and store the new position information in the storer, in response to receiving new position information.

The image processor may be configured to render the 3D image corresponding to the position information at the target time, in response to an amount of the position information stored in the storer being less than or equal to a desired (or alternatively, predetermined) reference.

The eye position tracker may be configured to determine the position information based on a user image.

Other example embodiments relate to an apparatus for predicting an eye position.

In some example embodiments, the apparatus for predicting an eye position may include a storer configured to store position information on an eye of a user during a sample time interval, a calculator configured to calculate a weighted average value of a variation of the position information, and a predictor configured to generate prediction position information on the eye of user at a target time based on the weighted average value.

The calculator may be configured to calculate a second weighted average value of a variation of the prediction position information during the sample time interval, and the predictor is configured to generate second prediction position information on the eye of user at the target time based on the second weighted average value.

The calculator may be configured to apply a weight to the variation of the position information, the weight increasing as the target time approaches during the sample time interval.

The predictor may be configured to generate the prediction position information at the target time based on a sum of the position information at the target time and a weighted average of the variation of the position information during the sample time interval.

The storer is configured to shift position information stored in the storer in advance and store the new position information in the storer, in response to receiving new position information.

Other example embodiments relate to a method of predicting an eye position.

In some example embodiments, the method of predicting an eye position receiving position information on an eye of a user during a sample time interval, calculating a weighted average value of a variation of the position information, and generating prediction position information on the eye of user at a target time based on the weighted average value.

The method of predicting an eye position may further include calculating a second weighted average value of a variation of the prediction position information during the sample time interval, and generating second prediction position information on the eye of user at the target time based on the second weighted average value.

The calculating may include applying a weight to the variation of the position information, the weight increasing as the target time approaches during the sample time interval.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 8 is a flowchart illustrating an example of a method of predicting an eye position according to at least one example embodiment.

DETAILED DESCRIPTION OF EXAMPLE EMBODIMENTS

Figure 1A:
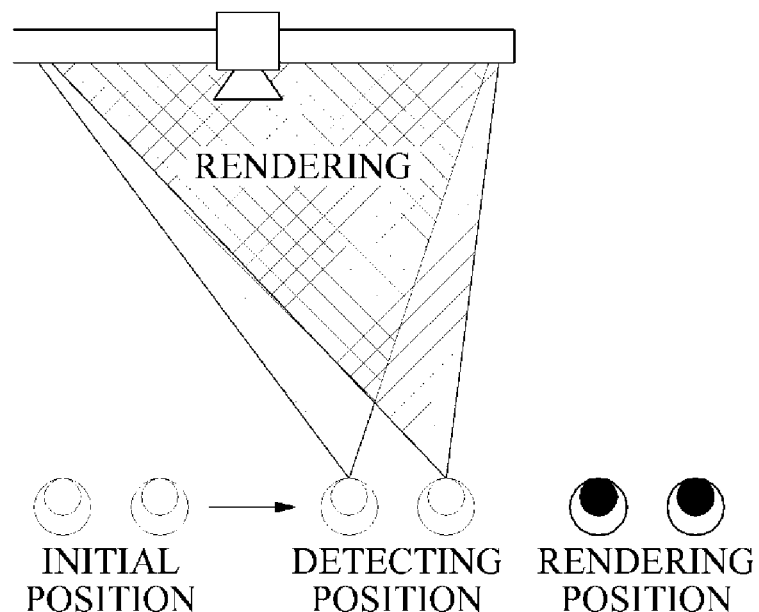
FIGS. 1A and 1B illustrate examples of rendering a detected eye position and a predicted eye position according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 1B:
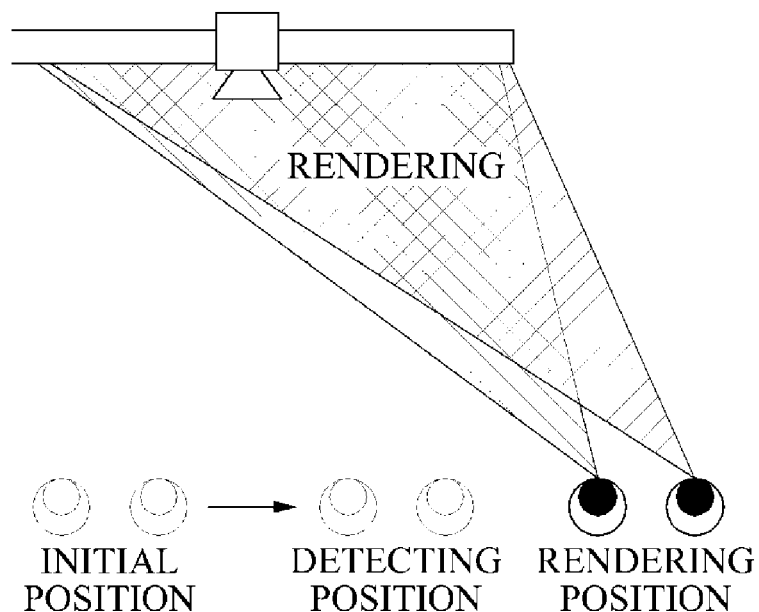

FIGS. 1A and 1B illustrate examples of rendering a detected eye position and a predicted eye position according to at least one example embodiment.

FIG. 1A illustrates an example of rendering a detected eye position, and FIG. 1B illustrates an example of rendering a predicted eye position. An eye position of a user may be detected for an eye-tracking based glassless three-dimensional (3D) display. A 3D display apparatus may display a 3D image corresponding to the detected eye position of user. The 3D image may include an image output to a right eye of the user and an image output to a left eye of the user. To provide a user with a clear 3D image, the 3D display apparatus may accurately detect an eye position of the user and accurately output the 3D image to the eye position of user.

When the user moves, a process of detecting the eye position of user and accurately outputting the 3D image to the eye position of user may be difficult. For example, referring to FIGS. 1A and 1B, the user may move to a rendering position from an initial position, through a detecting position. Here, the detecting position may be an eye position of user at a point in time the 3D display apparatus detects the eye position of user, and the rendering position may be an eye position of user at a point in time the 3D display apparatus renders the 3D image.

A desired (or alternatively, predetermined) time may pass while rendering an input image to a 3D image and detecting the eye position of user from a user image by the 3D display apparatus. Accordingly, when the user moves, crosstalk may be generated due to a delay caused by the desired (or alternatively, predetermined) time. For example, referring to FIG. 1A, when the eye position of user moves to the rendering position from the detecting position, crosstalk may be generated when the 3D display apparatus outputs a 3D image to the detecting position at which an eye of user is detected. Referring to FIG. 1B, when the 3D display apparatus predicts the rendering position of the eye of user and outputs the 3D image to the rendering position, crosstalk may be reduced (or alternatively, prevented). Accordingly, predicting an eye position based on a movement of user and outputting a 3D image to the predicted eye position is desired.

Figure 2:
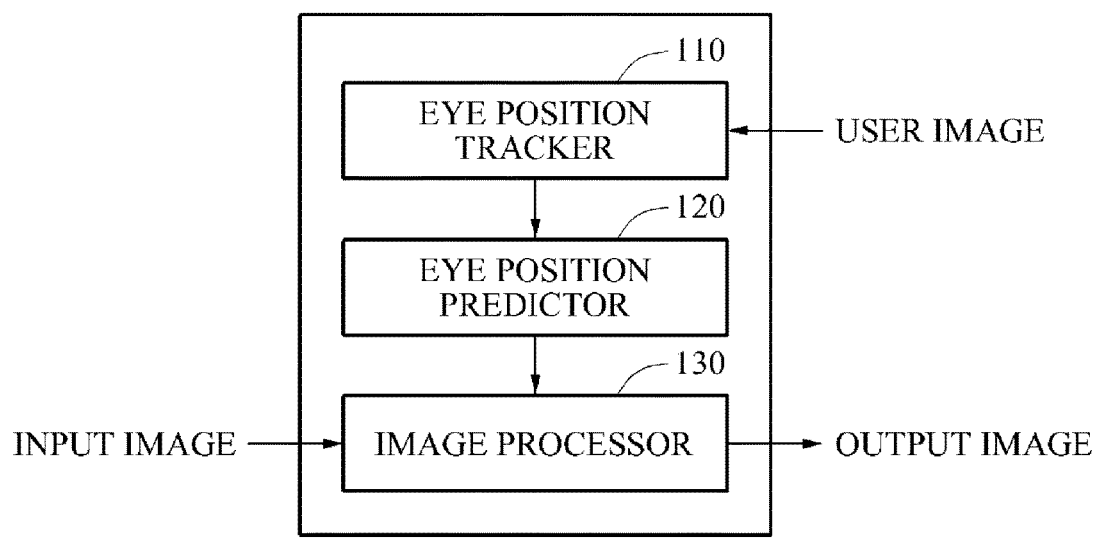
FIG. 2 is a block diagram illustrating an example of a three-dimensional (3D) display apparatus according to at least one example embodiment.

FIG. 2 is a block diagram illustrating an example of a 3D display apparatus according to at least one example embodiment.

Referring to FIG. 2, a 3D display apparatus 100 includes an eye position tracker 110, an eye position predictor 120, and an image processor 130.

The eye position tracker 110 may determine position information on an eye of a user based on a user image. The eye position tracker 110 may include an image sensor. The eye position tracker 110 may sense the user image using the image sensor, and determine the position information on the eye of user. The position information may be information on an actual position of the eye of user detected from the user image. The position information may include a coordinate value of the actual position of the eye of user. The eye position tracker 110 may detect a face of the user from the user image, and determine position information on eye of user from the detected face of user. The eye position tracker 110 may determine the position information based on data trained with respect to various types of faces and eyes, or relative positions of faces and eyes.

The eye position tracker 110 may track the eye position of user in a 3D space expressed by an x-y-z coordinate system. The position information may include 3D coordinate values to indicate a position of a right eye of the user and a position of a left eye of the user.

The eye position predictor 120 may generate prediction position information on the eye of user at a target time based on a variation of the position information during a sample time interval. The prediction position information may be information on prediction position of the eye of user calculated from the position information. For example, the position information may correspond to the detecting position illustrated in FIG. 1, and the prediction position information may correspond to the rendering position illustrated in FIG. 1. The prediction position information may include a coordinate value of a prediction position of eye of the user.

The target time may be a point in time at which rendering is complete. The target time may be referred to as a current time. The sample time interval may be a time interval providing a sample for generating the prediction position information at the target time. The sample time interval may be a desired (or alternatively, predetermined) time interval prior to the target time. For example, when a time interval "t" is "n−10" through "n", the sample time interval is "n−10" through "n", and the target time is "n".

The eye position predictor 120 may generate the prediction position information on the eye of user at the target time based on the variation of the position information during the sample time interval. The prediction position information may include first prediction position information generated based on the variation of the position information and second prediction position information generated based on a variation of the first prediction position information. Concisely, the eye position predictor 120 may generate the first prediction position information based on the variation of the position information, and generate the second prediction position information based on the variation of the first prediction position information. Hereinafter, a process for generating the first prediction position information and the second prediction position information will be described in detail.

The process for generating the first prediction position information will be described with reference to the following descriptions.

The first prediction position information may be position information generated based on the variation of the position information. The first prediction position information will be described in detail with reference to FIG. 5.

Figure 5:
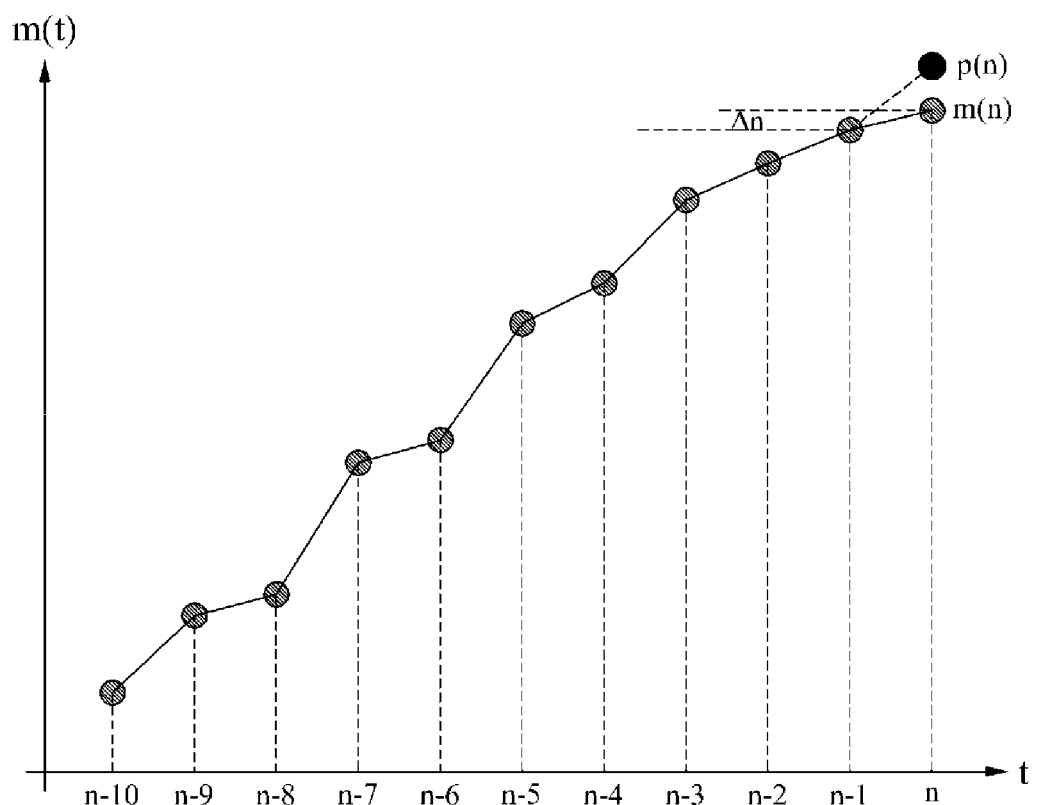
FIG. 5 illustrates an example of a process of generating first prediction position information according to at least one example embodiment.

FIG. 5 illustrates an example of a process of generating first prediction position information according to at least one example embodiment.

Referring to FIG. 5, a graph of position information during a sample time interval n−10 through n and first prediction position information at target time n is illustrated.

The position information and the first prediction information may include a 3D x-y-z coordinate, and the position information and the first prediction information in FIG. 5 may be coordinate values of any one axis among the 3D coordinates. In addition, the position information and the first prediction information may be coordinate values of any one of a left eye or a right eye of the user. Accordingly, when the following descriptions are applied to the remaining axes and eyes, 3D first prediction position information on both eyes may be obtained.

The eye position predictor 120 may generate first prediction position information using Equation 1.

$$p1(n) = \frac{\alpha}{W}\left[\sum_{t=n-T}^{t=n} w(t)(m(t) - m(t-1))\right] + m(n) \quad \text{[Equation 1]}$$

In Equation 1, "p1(n)" denotes first prediction position information at "n", and "m(n)" denotes position information at "n". "m(t)−m(t−1)" denotes a variation of position information at "t" and "t−1". "w(t)" denotes a weight of "m(t)−m(t−1)", and "W" denotes a total sum of the weight "w(t)". "α" denotes a multiple factor. "α" may be controlled by a user and/or based on empirical evidence. For example, when a delay in generating of the position information or rendering of a 3D image increases, the user may set "α" as a relatively high value. "T" denotes a number of the position information used for generating the first predict position information. Hereinafter, identical parameters have identical meanings.

The weight may be a relatively high value close to a target time during a sample time interval. For example, the weight may be determined based on a normal distribution having a maximum value at the target time. The weight may have a relatively low value at a time further away from the target time. As such, it should be understood that the weight applied to the variation of the position information may increase as the target time is approached during the sample time interval. Equation 2 denotes "w(t)" according to at least one example embodiment.

$$w(t) = e^{-\frac{(t-n)^2}{2\sigma^2}} \quad \text{[Equation 2]}$$

Equation 2 denotes a normal distribution having a maximum value at a target time. In Equation 2, "σ²" denotes a variance of the normal distribution. "σ" may be controlled by a user. Equation 3 denotes "W".

$$W = \Sigma_{t=n-T}^{t=n} w(t) \quad \text{[Equation 3]}$$

Based on the aforementioned descriptions of parameters, the right hand side of Equation 1 denotes a sum of the position information at the target time and a weighted average of the variation of the position information during the sample time interval. Accordingly, the eye position predictor 120 may generate the first prediction position information at the target time based on the sum of the position information at the target time and the weighted average of variation of position information during the sample time interval. In addition, the eye position predictor 120 may calculate a weighted average value of a variation of the position information, generate the first prediction position information based on the weighted average value. The eye position predictor 120 may generate second prediction position information based on the first prediction position information. Hereinafter, the second prediction position information will be described in detail.

The process for generating the second prediction position information will be described with reference to the following descriptions.

The second prediction position information may be position information generated based on the variation of the first prediction position information. The second prediction position information will be described in detail with reference to FIG. 6.

Figure 6:
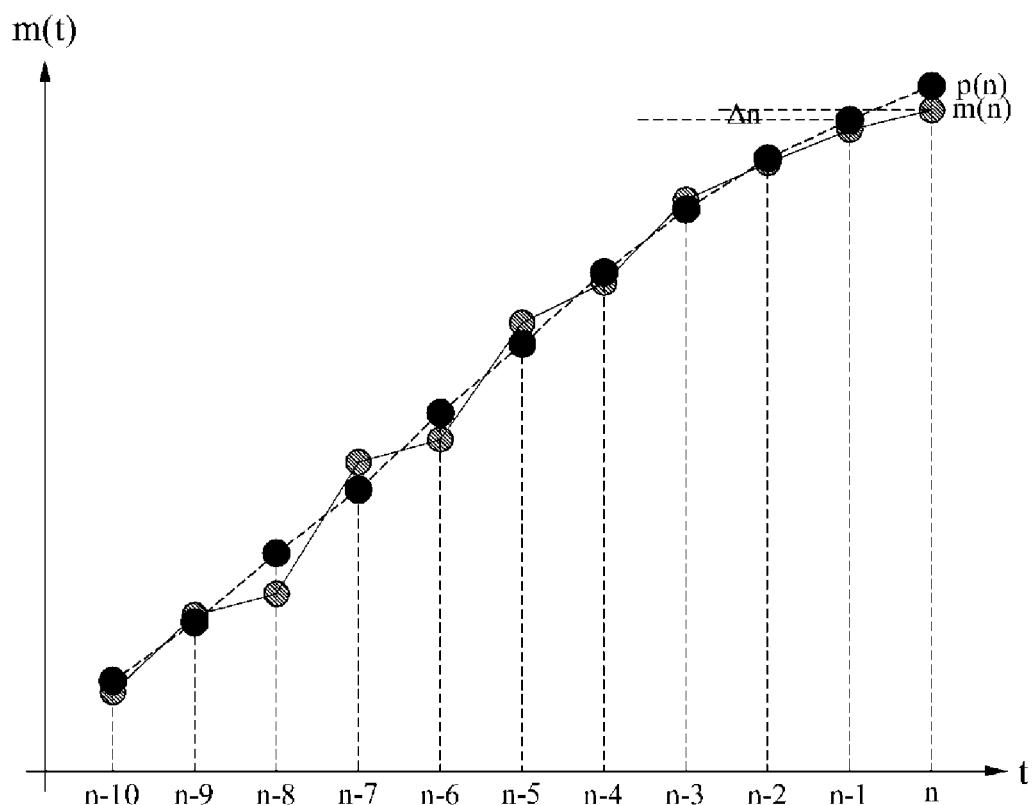
FIG. 6 illustrates an example of a process of generating second prediction position information according to at least one example embodiment.

FIG. 6 illustrates an example of a process of generating second prediction position information according to at least one example embodiment.

Referring to FIG. 6, a graph of position information during a sample time interval "n−10" through "n", first prediction position information during the sample time interval "n−10" through "n", and second prediction position information at a target time "n" is illustrated.

The position information and the prediction information may include a 3D x-y-z coordinate, and the position information and the prediction information in FIG. 6 may be a coordinate value of any one axis among the 3D coordinates. In addition, the position information and the prediction information in FIG. 6 may be a coordinate value of any one of a left eye or a right eye of the user. Accordingly, when the following descriptions are applied to the remaining axes and eyes, 3D second prediction position information on both eyes may be obtained.

The eye position predictor 120 may generate second prediction position information using Equation 4.

$$p2(n) = \frac{\alpha}{W}\left[\sum_{t=n-T}^{t=n} w(t)(p1'(t) - p1(t-1))\right] + m(n) \quad \text{[Equation 4]}$$

In Equation 4, "p2(n)" denotes second prediction position information at "n", and "m(n)" denotes position information at "n". When "p1'(t)" is "t=n", "p1'(t)" denotes "m(t)". When "p1'(t)" is "t≠n", "p1'(t)" denotes "p1(t)". "p1'(t)−p1(t−1)" denotes a variation of first prediction position information at "t" and "t−1". "w(t)" denotes a weight of "p1'(t)−p1(t−1)", and "W" denotes a total sum of the weight "w(t)". "α" denotes a multiple factor. With respect to "α", the descriptions of Equation 1 may be applied to "α". "T" denotes a number of the position information used for generating the prediction position information.

The weight may be a relatively high value close to a target time during a sample time interval. For example, the weight may be determined based on a normal distribution having a maximum value at the target time. The weight may have a relatively low value at a time further away from the target time. As such, it should be understood that the weight applied to the variation of the position information may increase as the target time is approached during the sample time interval. With respect to "w(t)" and "W", the descriptions of Equation 2 and Equation 3 may be applied to "w(t)" and "W".

Based on the aforementioned descriptions of parameters, the right hand side of Equation 4 denotes a sum of the position information at the target time and a weighted average of a variation of the first prediction position information during the sample time interval. Accordingly, the eye position predictor 120 may generate the second prediction position information at the target time based on the sum of the position information at the target time and the weighted average of the variation of first prediction position information during the sample time interval. In the present disclosure, a weighted average value of first prediction position information during a sample time interval may be referred to as a second weighted average value.

The eye position predictor 120 may calculate the second weighted average value of the variation of first prediction position information, and generate the second prediction position information based on the second weighted average value.

Referring back to FIG. 2, a 3D display apparatus 100 will be described. Referring to FIG. 2, an image processor 130 generates an output image of an input image based on prediction position information. Here, the prediction position information may be the first prediction position information or the second prediction position information described above. In addition, the input image may be a stereo image, and the output image may be a 3D image rendered based on the prediction position information. The output image may be a 3D image corresponding to a coordinate value based on the prediction position information.

To predict an eye position, a sample more than or equal to a desired (or alternatively, predetermined) reference, for example, a sufficient amount of position information, may be desired. For example, referring to FIGS. 5 and 6 which will be described hereinafter, position information corresponding to 10 frames may be required. When a sample sufficient to predict the eye position, for example, the sufficient amount of position information, is not stored, the image processor 130 may render a 3D image corresponding to the position information until the sufficient sample is stored. The image processor 130 may render the 3D image corresponding to the position information at the target time, in response to an amount of the position information stored in advance being less than or equal to the desired (or alternatively, predetermined) reference.

Figure 3:
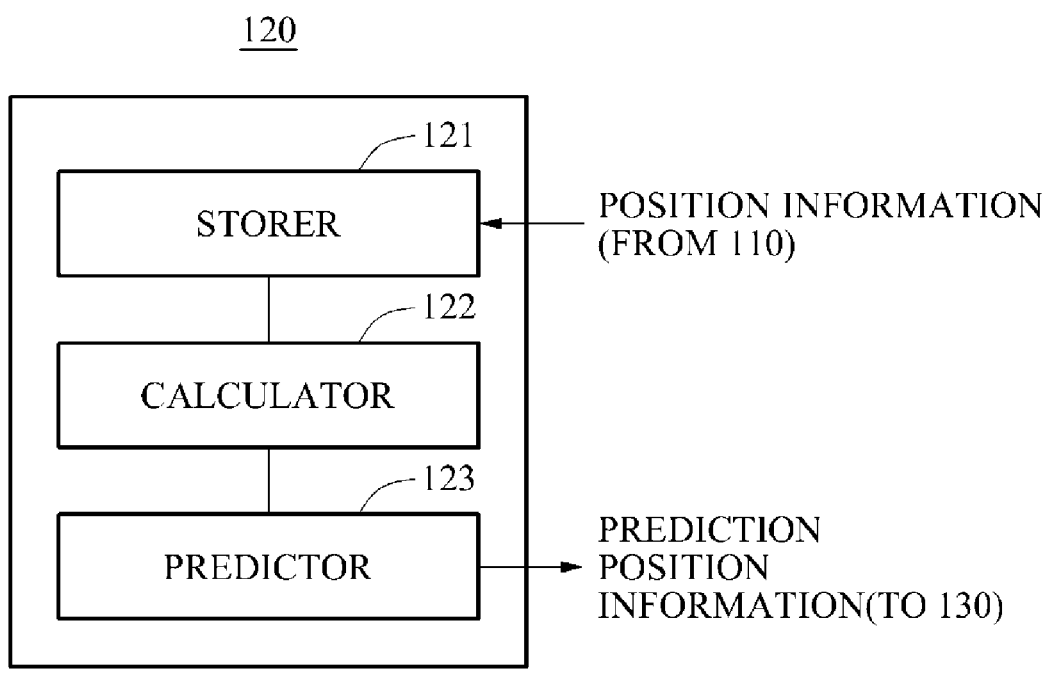
FIG. 3 is a block diagram illustrating an example of an eye position predictor according to at least one example embodiment.

FIG. 3 is a block diagram illustrating an example of an eye position predictor according to at least one example embodiment.

Referring to FIG. 3, the eye position predictor 120 includes a storer 121, a calculator 122, and a predictor 123.

The storer 121 stores position information on an eye of a user during a sample time interval. The storer 121 may receive the position information from the eye position tracker 110, and store the received position information. The storer 121 may shift the position information stored in the storer 121 in advance, in response to receiving new position information. The operation of the storer 121 will be described in detail with reference to FIG. 4.

Figures 4A, 4B, 4C:
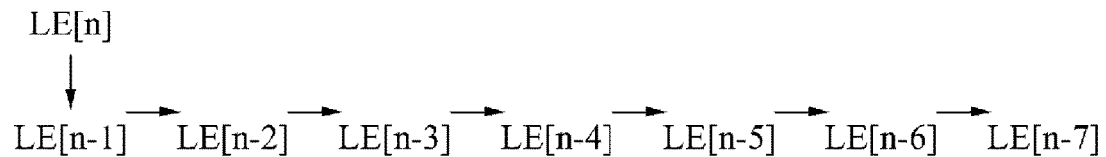
FIGS. 4A through 4C illustrate an example of a storing process of a storer according to at least one example embodiment.

FIGS. 4A through 4C illustrate an example of a storing process of a storer according to at least one example embodiment.

Referring to FIG. 4, the storer 121 of FIG. 3 and a coordinate value of position information "LE[k]" are illustrated. In an example, the storer 121 may be a buffer. The coordinate value "LE[k]" may be referred to as a coordinate value of a left eye. The storer 121 may store the coordinate value "RE[k]" referred to as a coordinate value of a right eye. Each of "LE[k]" and "RE[k]" may include a 3D x-y-z coordinate value. Referring to FIG. 4, "n" denotes as a number of frames used in the storer 121.

FIG. 4A illustrates position information stored in advance "LE[n−1]" through "LE[n−7]". FIG. 4B illustrates a shift of the position information stored in advance "LE[n−1]" through "LE[n−7]", prior to storing new position information "LE[n]". FIG. 4C illustrates a storing of the new position information "LE[n]", subsequent to the shift. The storer 121 may store the new position information "LE[n]" through the processes of FIGS. 4A through 4C. Since the position information is stored in the storer 121 according to a time flow, the storer 121 may manage the position information without a need for further indexing. The calculator 122 may calculate a weighted sum by applying a highest weight to a most recently stored value.

Referring back to FIG. 3, the eye position predictor 120 will be described. The calculator 122 calculates a weighted average value of a variation of the position information. The calculator 122 may calculate the weighted average value based on the weight. The calculator 122 may apply the weight to the variation of position information, the weight being a relatively high value according to a closed to a target time during a sample time interval. In addition, the calculator 122 may calculate second weighted average value based on a variation of first prediction position information during the sample time interval.

The predictor 123 generates prediction position information on eye of user at the target time based on the weighted average value. The predictor 123 may transmit the generated prediction position information to the image processor 130. The predictor 123 may generate the prediction position information at the target time based on a sum of the position information at the target time and the weighted average of the variation of the position information during the sample time interval. The predictor 123 may generate second prediction position information on eye of user at the target time based on a second weighted average value calculated by the calculator 122.

Figure 7:
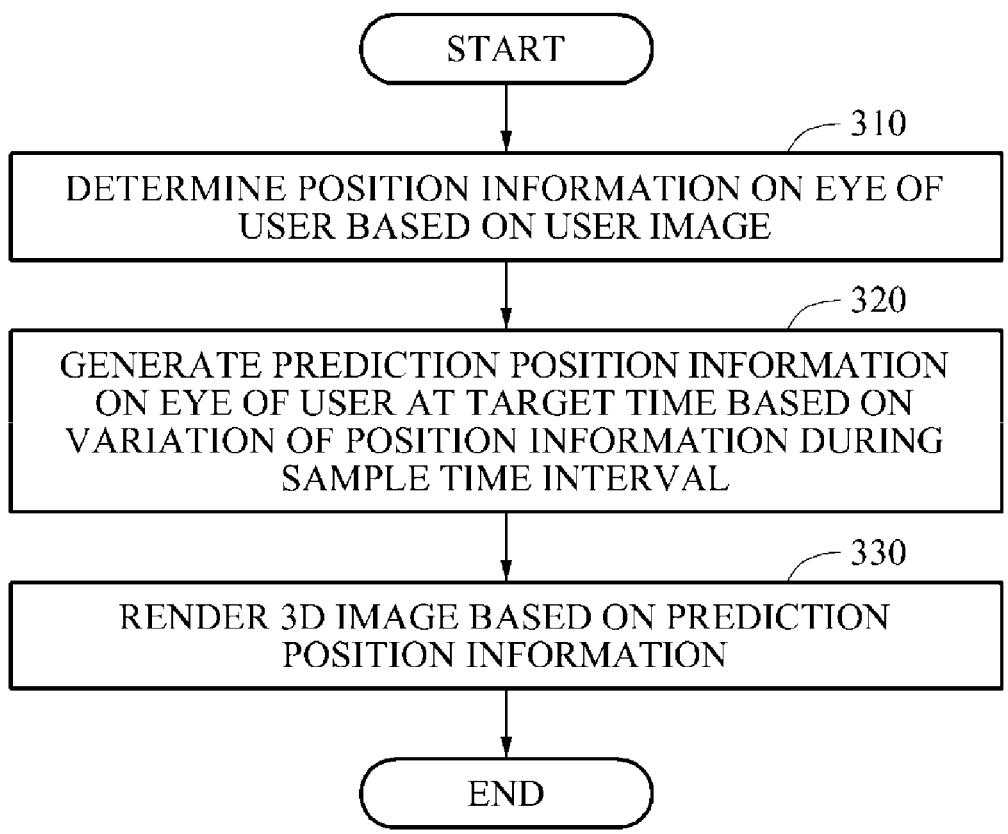
FIG. 7 is a flowchart illustrating an example of a method of generating a 3D image according to at least one example embodiment.

FIG. 7 is a flowchart illustrating an example of a method of generating a 3D image according to at least one example embodiment.

Referring to FIG. 7, in operation 310, a 3D display apparatus 100 determines position information on an eye of user based on a user image. The 3D display apparatus 100 may include an image sensor to determine the position information. The 3D display apparatus 100 may sense the user image using the image sensor, and determine the position information on the eye of user. The position information may be information on an actual position of the eye of user detected from the user image. The position information may include a coordinate value of the actual position of the eye of user.

In operation 320, the 3D display apparatus 100 generates prediction position information on the eye of user at the target time based on a variation of the position information during a sample time interval. The prediction position information may be information on a prediction position of the eye of user. The prediction position information may include first prediction position information and second prediction position information. With respect to the position information and the prediction position information, the aforementioned descriptions may be applied to the position information and the prediction position information.

In operation 330, the 3D display apparatus 100 renders a 3D image based on the prediction position information. The 3D display apparatus 100 may render the 3D image corresponding to a coordinate value based on the prediction position information. Even when a user moves, the user may view a clear 3D video corresponding to the prediction position information.

FIG. 8 is a flowchart illustrating an example of a method of predicting an eye position according to at least one example embodiment.

Referring to FIG. 8, in operation 321, an apparatus for predicting an eye position receives position information on an eye of user during a sample time interval. The position information may include a coordinate value of the eye position of the user.

In operation 322, the apparatus for predicting an eye position may store the position information. The apparatus for predicting an eye position 120 may shift position information stored in advance and store the new position information, in response to receiving new position information. When a sample sufficient to predict the eye position, for example, the sufficient amount of position information, is not stored, the apparatus for predicting an eye position 120 may render a 3D image corresponding to the position information until the sufficient sample is stored. The apparatus for predicting an eye position 120 may render the 3D image corresponding to the position information at the target time, in response to an amount of the position information stored in advance being less than or equal to the desired (or alternatively, predetermined) reference.

In operation 323, the apparatus for predicting an eye position 120 calculates a weighted average value of a variation of the position information. The apparatus for predicting an eye position 120 may calculate the weighted average value based on a weight. The apparatus for predicting an eye position 120 may apply the weight to the variation of the position information, the weight being a relatively high value according to a closed to the target time during the sample time interval. In addition, the eye position prediction information may calculate second weighted average value based on a variation of first prediction position information on the sample time interval.

In operation 324, the apparatus for predicting an eye position 120 generates prediction position information on the eye of user at the target time based on the weighted average value. The apparatus for predicting an eye position may generate the prediction position information at the target time and a weighted average of the variation of the position information during the sample time interval. The apparatus for predicting an eye position 120 may generate second prediction position information on the eye of user at the target time based on the second weighted average value.

The units and/or modules described herein may be implemented using hardware components and software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor (i.e., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) display apparatus, comprising:
    an eye position tracker configured to determine detected position information of an eye of a user;
    an eye position predictor configured to generate prediction position information of the eye of the user at a target time based on a variation of the detected position information during a sample time interval; and
    an image processor configured to render a 3D image based on the prediction position information,
    wherein a length of the sample time interval is longer than zero seconds, and
    wherein the detected position information comprises information corresponding to a plurality of positions of the eye of the user detected during the sample time interval.

2. The apparatus of claim 1, wherein the eye position predictor is configured to generate the prediction position information at the target time based on a sum of the detected position information at the target time and a weighted average of the variation of the detected position information during the sample time interval.

3. The apparatus of claim 1, wherein the eye position predictor is configured to calculate a weighted average value of the variation of the detected position information, and generate the prediction position information based on the weighted average value.

4. The apparatus of claim 1, wherein the eye position predictor is configured to apply a weight to the variation of the detected position information, the weight increasing as the target time approaches during the sample time interval.

5. The apparatus of claim 4, wherein the weight is determined based on a normal distribution having a maximum value at the target time.

6. The apparatus of claim 1, wherein the prediction position information comprises first prediction position information generated based on the variation of the detected position information and second prediction position information generated based on a variation of the first prediction position information.

7. The apparatus of claim 6, wherein the image processor is configured to render the 3D image based on the second prediction position information.

8. The apparatus of claim 1, wherein the eye position predictor comprises a storer configured to store the detected position information of the eye of the user during the sample time interval, and the storer is configured to shift the detected position information stored in the storer and store new position information in the storer in response to receiving the new position information.

9. The apparatus of claim 8, wherein the image processor is configured to render the 3D image corresponding to the detected position information at the target time if an amount of the position information stored in the storer is less than or equal to a reference amount.

10. The apparatus of claim 1, wherein the eye position tracker is configured to determine the detected position information based on a user image.

11. An apparatus for predicting an eye position, comprising:
    a storer configured to store detected position information of an eye of a user during a sample time interval;
    a calculator configured to calculate a weighted average value of a variation of the detected position information; and
    a predictor configured to generate prediction position information of the eye of the user at a target time based on the weighted average value,
    wherein a length of the sample time interval is longer than zero seconds, and
    wherein the detected position information comprises information corresponding to a plurality of positions of the eye of the user detected during the sample time interval.

12. The apparatus of claim 11, wherein the calculator is configured to calculate a second weighted average value of a variation of the prediction position information during the sample time interval, and the predictor is configured to generate second prediction position information of the eye of the user at the target time based on the second weighted average value.

13. The apparatus of claim 11, wherein the calculator is configured to apply a weight to the variation of the detected position information, the weight increasing as the target time is approached during the sample time interval.

14. The apparatus of claim 11, wherein the predictor is configured to generate the prediction position information at the target time based on a sum of the detected position information at the target time and a weighted average of the variation of the detected position information during the sample time interval.

15. The apparatus of claim 11, wherein the storer is configured to shift the detected position information stored in the storer and to store new position information in the storer in response to receiving the new position information.

16. A method of predicting an eye position, comprising:
receiving detected position information of an eye of a user during a sample time interval;
calculating a weighted average value of a variation of the detected position information; and
generating prediction position information of the eye of the user at a target time based on the weighted average value,
wherein a length of the sample time interval is longer than zero seconds, and
wherein the detected position information comprises information corresponding to a plurality of positions of the eye of the user detected during the sample time interval.

17. The method of claim 16, further comprising:
calculating a second weighted average value of a variation of the prediction position information during the sample time interval; and
generating second prediction position information of the eye of the user at the target time based on the second weighted average value.

18. The method of claim 16, wherein the calculating comprises applying a weight to the variation of the detected position information, the weight increasing as the target time is approached during the sample time interval.

19. The method of claim 16, further comprising:
storing, in a storer, the detected position information;
receiving new position information; and
shifting the detected position information in the storer to store the new position information.

20. The method of claim 16, further comprising:
rendering an image based on the prediction position information.

* * * * *